United States Patent [19]

Johnson

[11] Patent Number: 4,529,887
[45] Date of Patent: Jul. 16, 1985

[54] RAPID POWER RESPONSE TURBINE

[75] Inventor: Kenneth O. Johnson, Cincinnati, Ohio

[73] Assignee: General Electric Company, Cincinnati, Ohio

[21] Appl. No.: 506,085

[22] Filed: Jun. 20, 1983

[51] Int. Cl.³ .............................................. F11D 15/10
[52] U.S. Cl. ............................... 290/40 R; 290/40 A; 290/40 B; 290/40 C; 60/39.27
[58] Field of Search ................... 290/40, 40 R, 40 A, 290/40 B, 40 C, 40 D, 40 E, 40 F; 60/39.27, 39.281

[56] References Cited

U.S. PATENT DOCUMENTS

| | | | |
|---|---|---|---|
| 3,255,586 | 6/1966 | Henning et al. | 60/39.27 X |
| 3,342,999 | 9/1967 | Townsend | 290/40 R |
| 3,584,459 | 6/1971 | Amann | 60/39.27 X |
| 3,878,400 | 4/1975 | McSparran | 290/40 X |
| 3,977,182 | 8/1976 | Schroff | 60/39.281 X |
| 4,060,980 | 12/1977 | Elsaesser et al. | 60/39.27 X |
| 4,219,738 | 8/1980 | Griesinger | 290/52 X |
| 4,309,871 | 1/1982 | Venema | 60/39.281 |
| 4,408,585 | 10/1983 | Stuckas | 60/39.281 |
| 4,417,194 | 11/1983 | Curtiss et al. | 290/40 B X |

Primary Examiner—Vit W. Miska
Assistant Examiner—Paul Shik Luen Ip
Attorney, Agent, or Firm—Gregory A. Welte; Derek P. Lawrence

[57] ABSTRACT

In one form of the invention, means are provided for sensing changes in electrical power demanded from an electrical generator driven by a gas turbine engine. In response, other means change the rate of fuel and air delivery to the engine in proportion to the demand changes and keep the combustor fuel-air ratio substantially constant.

3 Claims, 16 Drawing Figures

RAPID POWER RESPONSE TURBINE

The present invention relates to gas turbine engines having the capability to provide rapid changes in power delivered and, more particularly, to such engines which are of the twin-spool type and provide the rapid changes without substantial changes in speed of the gas generator. Such an invention can find significant application in electrical power generation systems.

BACKGROUND OF THE INVENTION

In an electrical network powered by an alternating current generator, it is generally important that the frequency of the generator be held stable, for example, within a five percent range of a target frequency of 60 Hz. This stability requirement poses a problem when a twin-spool gas turbine engine is used to drive the electrical generator. (A twin-spool engine is one having a first, high pressure spool concerned with the generation of a high velocity gas stream, and thus the first spool is also referred to as a gas generator stage. A second, power spool is utilized in the extraction of mechanical energy from the gas stream by means of a power turbine. The mechanical energy extracted is utilized to drive the electrical generator.)

A problem arises when the electrical load on the electrical generator changes, as when a large electrical load is either connected to, or disconnected from, the network. The load change causes a change to occur in the mechanical energy demanded by the electrical generator, thus necessitating a change in the energy in the gas stream delivered by the gas generator.

In general, the energy delivered by the gas generator cannot change instantaneously because the energy contained in the gas stream is a function of the rotational speed of rotating components of the gas generator. These components need a finite time to change speed. Thus, a time lag occurs between the change in electrical load demanded and the change in gas generator speed in response. During this time lag the frequency of the electrical generator deviates from the target frequency. Many times, this deviation is too great in either magnitude, duration, or both, to be tolerated by the electrical network.

In addition, the exhaust gases produced by the gas generator are commonly recovered by a heat exchanger after these gases have delivered energy to the power turbine. It is known that a heat exchanger works with increased efficiency as the temperature gradient across it increases. However, it is also known that changing the speed of the gas generator in a twin-spool engine results in a change in the exhaust gas temperature, and that this change is lesser in magnitude than the corresponding change encountered in a single spool engine when the power output of the latter is changed. For example, as the power output decreases in a single spool engine in order to deliver proper energy to the power turbine, the exhaust gas temperature decreases significantly since airflow remains essentially constant while fuel flow decreases. In this example, the efficiency of the heat exchanger correspondingly decreases more than it would if a twin-spool engine were used. Therefore, even if the response time of the single-spool engine is satisfactory to maintain proper network frequency, decreased efficiency in heat recovery is encountered. Accordingly, while frequency may be maintained, the operating efficiency of the system is reduced.

Moreover, the power delivered in a single engine of nonvariable geometry drops approximately as the fourth power of speed. Accordingly, a deceleration resulting from a load increase can easily slow the engine to a point from which recovery is impossible because of the greatly reduced power output at the lower speed. Typically, an electrical generation utilizes multiple engines. In a system using multiple single spool engines, the response to an overload condition is to disconnect equipment from the generators (i.e., to shed load) rapidly and, ideally, within a very short time such as 30 milliseconds. Given that it is difficult to detect an overload and then to shed load within such a short time, the occurrence of the overload can cause the engines to slow to an irrecoverable operating point.

OBJECTS OF THE INVENTION

It is an object of the present invention to provide a new and improved gas turbine engine having rapid power response capability.

It is a further object of the present invention to provide a new and improved gas turbine engine of the twin spool type which operates at a substantially constant gas generator speed and substantially constant power turbine speed despite changes in power delivered by the power turbine to an external load.

It is a further object of the present invention to provide a new and improved gas turbine engine of the twin-spool type which operates at a substantially constant exhaust gas temperature at different output power conditions.

It is a further object of the present invention to provide a new and improved electrical generator which allows a greater time margin for shedding load under overload conditions.

SUMMARY OF THE INVENTION

In one form of the invention, means are provided for sensing changes in electrical power demanded from an electrical generator driven by a gas turbine engine. In response, other means change the rate of fuel and air delivery to the engine in proportion to the demand changes and keep the combustor fuel-air ratio substantially constant.

DETAILED DESCRIPTION OF THE INVENTION

Figure 1:
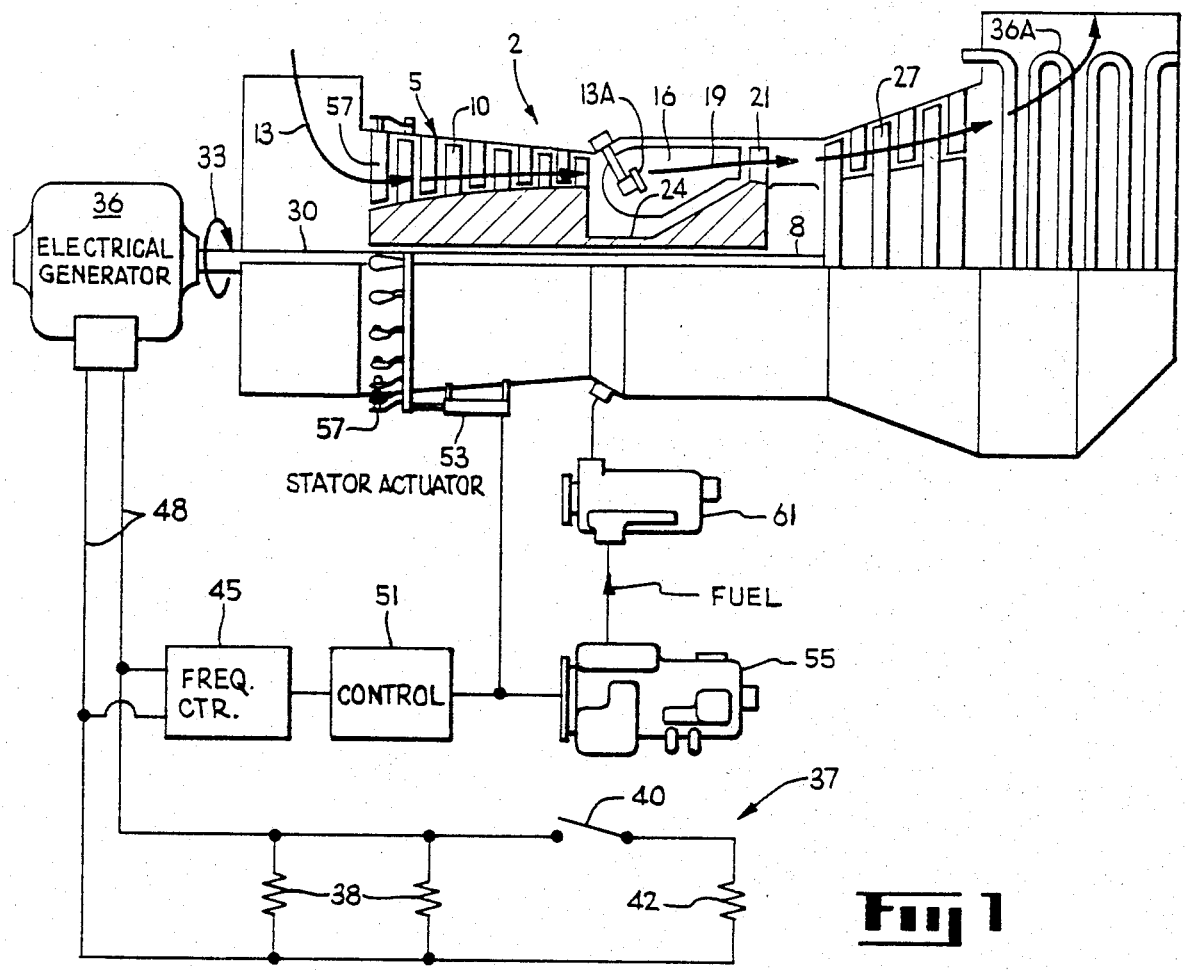
FIG. 1 illustrates one form of the present invention.

FIG. 1 illustrates a twin spool gas turbine engine 2 which has a first spool 5 and a second spool 8. The first spool 5 contains compressor stages 10 which compress inlet air 13 which is mixed with fuel (not shown) delivered by a fuel nozzle 13A and ignited in a combustor stage 16. Combustion gases 19 are discharged into a turbine stage 21 which is mechanically coupled by shaft 24 to the compressor stages 10 in order to compress additional inlet air 13 to continue the combustion process. The combustion gases 19, after passing the turbine stage 21 of the first spool 5, are directed to a power turbine 27 which drives a second shaft 30 which rotates as shown by arrow 33 and powers an electrical generator 36. The combustion gases 19 are ducted to a heat exchanger 36A for extraction of further energy from the combustion gases 19. The heat exchanger 36A can augment a hot water supply (used perhaps for bathing) when the system shown in FIG. 1 is used on board a ship to power electrical equipment.

The electrical generator 36 supplies electrical power to a network 37 indicated as resistors 38. The addition of a load to the electrical network 37 is indicated by the closing of a switch 40 which connects an additional resistor 42 to the network 37. This adds to the electrical generator 36 and tends to decelerate the electrical generator 36 as well as power turbine 27 which is directly coupled to the electrical generator 36. That is, kinetic energy stored in the rotating electrical generator 36 is converted into electrical energy, resulting in deceleration of the electrical generator 36. In order to counteract this deceleration, more power must be delivered by the combustion gases 19 to the power turbine 27.

The power delivered to the power turbine 27 is a function of the energy of the combustion gases 19. One measure of this energy is expressed in the equation $E = \frac{1}{2}MV^2$, wherein E represents energy, M represents the mass of the gas entering the power turbine 27, and $V^2$ indicates the square of the velocity of the gas having the mass M. In response to the deceleration of the electrical generator 36, this quantity E is sought to be increased.

The need for this increase is detected by a frequency counter 45 which monitors the frequency of the electrical power delivered to the output leads 48 of the generator 36. Thus, the frequency counter 45 functions to sense the increase in electrical power demanded and manifested as a deceleration of the generator 36. In response to a decrease in frequency, a control 51 coupled to the frequency counter 45 generates signals which are received by a stator actuator 53 and by a fuel control 55. The stator actuator 53 rotates variable stators 57 to increase inlet airflow 13. That is, stator angle is decreased. The fuel control 55 in response to the control 51 increases the fuel flow to the combustor stage 16 by increasing the output of a fuel valve 61. These combined effects of increasing inlet airflow 13 into the compressor 10 together with the increasing of fuel supplied to the combustor 16 are synchronized in such a way that the fuel/air ratio supplied to the combustor 16 remains substantially constant as the power output of the engine is increased. This provides an increase in energy release of the gas generator, i.e., in the combustion gases 19 (in pounds per second), so that increased energy is almost immediately delivered to the power turbine 27. The details concerning the design of the control 51 are not considered to be part of the present invention but are known in the art. Further, the amount of adjustment of the stators which is needed in a particular gas turbine engine in order to attain a given airflow at a given compressor speed is a known characteristic of the engine. The particular method of maintaining a constant fuel-air mixture is not considered to be part of the present invention. These general principles of fuel-air control are discussed in greater detail with reference to FIGS. 2A-H.

Figure 2A:
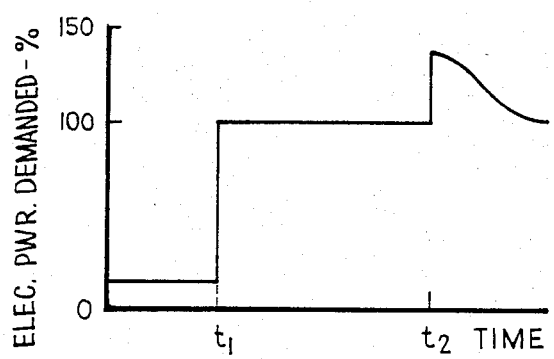
Figure 2E:
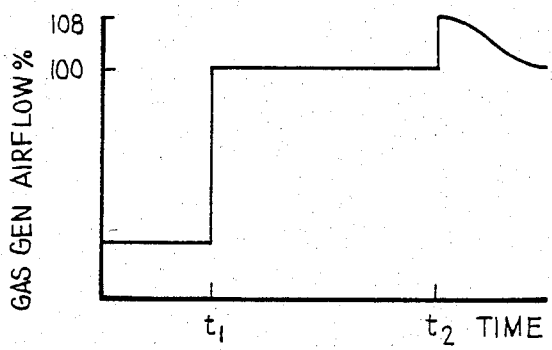
Figure 2B:
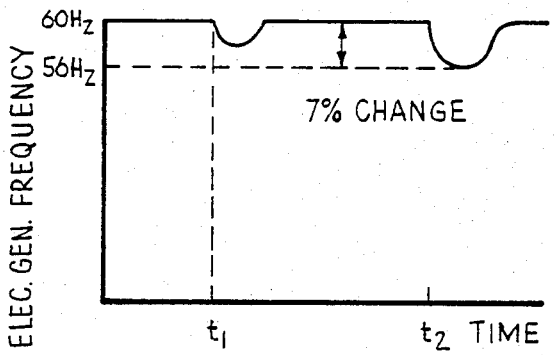
Figure 2F:
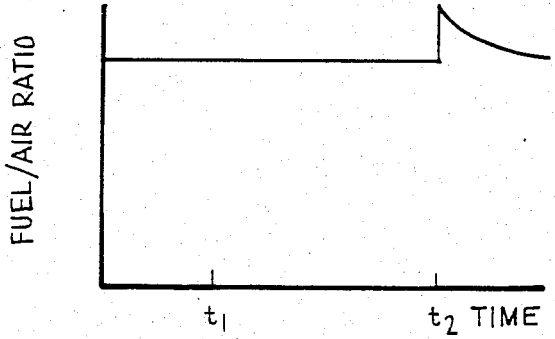
Figure 2C:
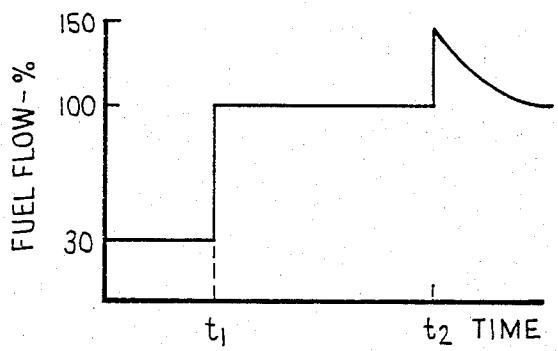
Figure 2G:
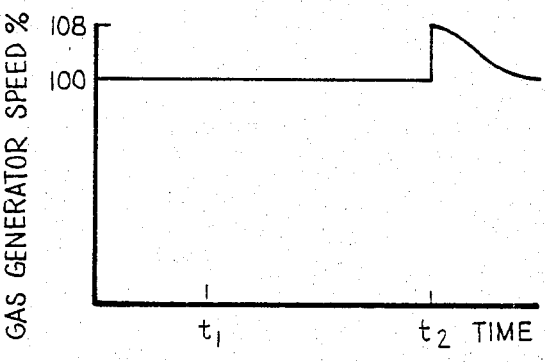
Figure 2D:
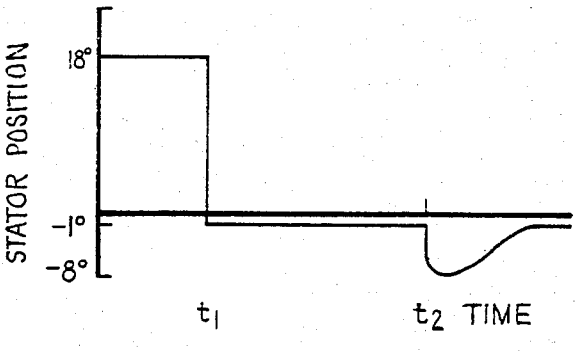

FIGS. 2A-H depict various engine operating parameters on vertical axes and time on the horizontal axes. FIG. 2A illustrates an increase in electrical power demand resulting from the closing of the switch 40 in FIG. 1. That is, the power demanded almost immediately increases from near zero, or idle, to 100% rated power. This causes an immediate deceleration of the generator 36, thus causing a frequency drop as shown in FIG. 2B. The frequency drop is sensed by the frequency counter 45 in FIG. 1 which triggers the control 51 into operation. The control 51 in response alters both the fuel flow and the stator positions as shown by FIGS. 2C and 2D. The fuel flow is increased from a nominal idle flow of 30% to 100% of rated flow. The stators are adjusted from a nominal value of 18 degrees at idle to a negative 1 degree to deliver 100% of rated power.

In response to the changes in fuel flow and stator position, as shown in FIG. 2E, the gas generator airflow increases (i.e., the energy in the combustion gases 19 in FIG. 1 increases). The changes in fuel flow and stator position are coordinated so that the fuel/air ratio remains substantially constant as shown in FIG. 2F. As shown in FIG. 2G, the gas generator speed similarly remains substantially constant. Therefore, the increased gas generator airflow supplied to the power turbine 27 in FIG. 1 results not from an increase in the gas generator speed, but in the production of hotter exhaust gases which travel at a higher velocity. Further, a greater amount of fuel and air is also burned as shown by FIGS. 2C and 2F so that the mass of exhaust gases is increased as well.

Figure 2H:
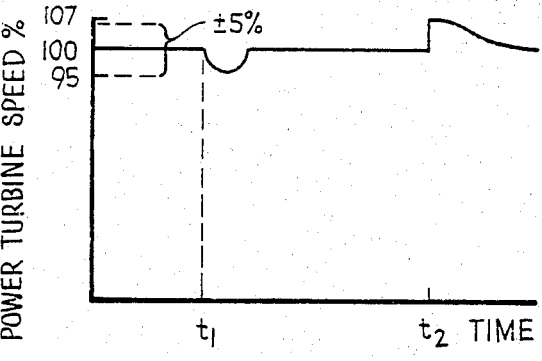

To repeat, fuel flow and stator position are adjusted to provide an increase in the mass of the combustion gases as well as in their velocity to deliver more power to the power turbine 27. This will, when properly executed, keep the power turbine speed within the acceptable limits, plus or minus 5%, as shown in FIG. 2H. The proper execution will depend upon operating characteristics of the particular engine used. Further, since the fuel-air ratio is kept constant, the temperature of the combustion gases 19 in FIG. 1 remains constant, since this temperature is largely a function of this ratio. Thus, the efficiency of the heat exchanger 36A is not lowered by a lowering of the exhaust gas temperature. Another conception of the behavior of these engine parameters is shown in FIGS. 3A-E.

Figure 3A:
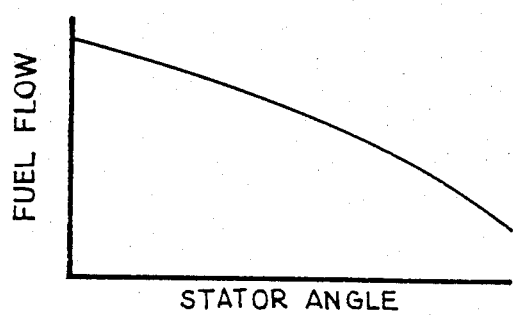
Figure 3D:
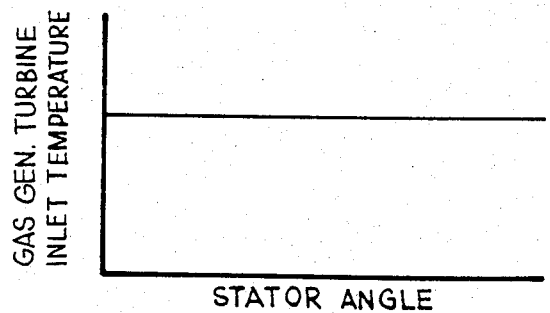

In those Figures, selected engine parameters are plotted as functions of core stator position at a time when the gas generator is running at 100% of rated speed. In FIG. 3A, it is seen that fuel flow (sometimes termed specific fuel consumption) decreases with stator angle; the ratio of compressor output pressure to compressor input pressure (i.e., compressor ratio) in FIG. 3B decreases with increasing stator angle; the gas generator speed of FIG. 3C stays constant with respect to stator angle, the gas generator inlet temperature of FIG. 3D stays constant with respect to stator angle; but the gas generator airflow in pounds per second in FIG. 3E decreases with core stator angle.

Figure 5:
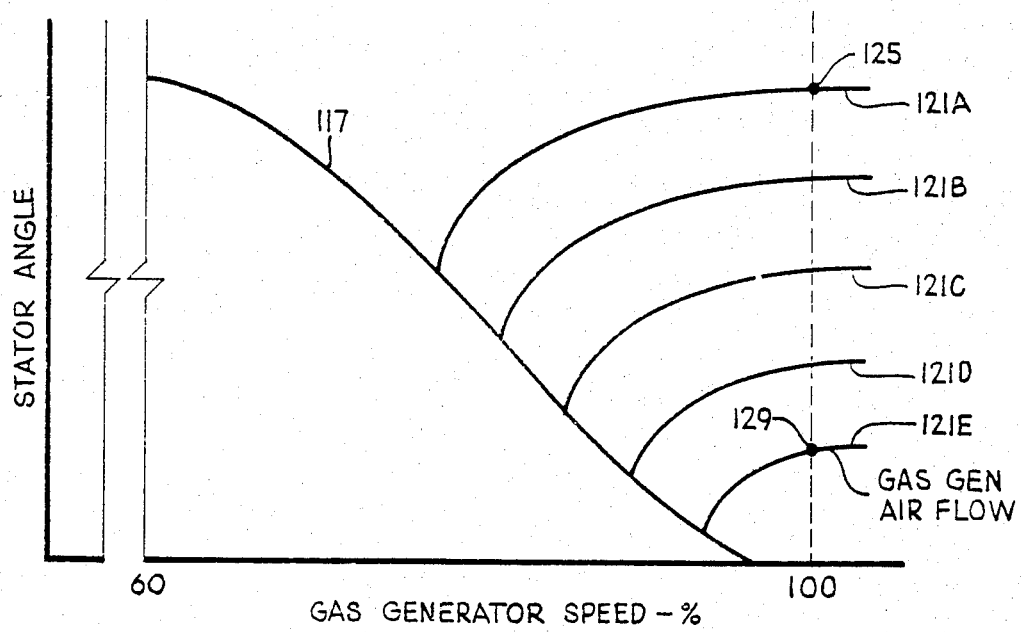
FIGS. 2A-H, 3A-E, 4, and 5 illustrate behavior of engine parameters involved in the present invention.
Figure 4:
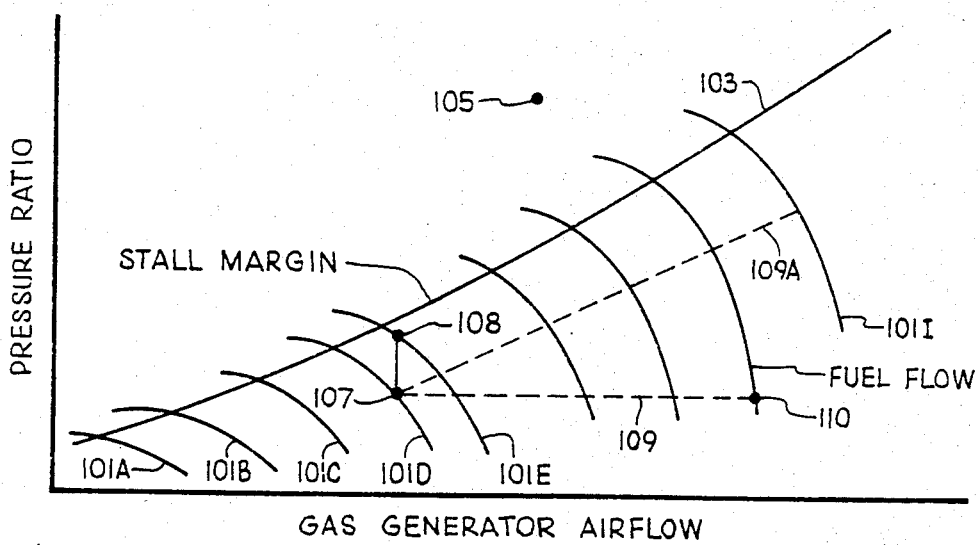

The particular manner of engine operation described above results in a type of engine operation which is further illustrated in FIGS. 4 and 5. FIG. 4 is a generalized plot of compressor pressure ratio as a function of the airflow (in mass per unit time) supplied by the gas generator 5 in FIG. 1. The concave lines 101A-I illustrate different fuel flows. The line 103 indicates a stall margin above which (such as at point 105) the engine cannot operate because it is in a stall mode.

If the engine is operating at a point such as 107, in order to increase the gas generator airflow by increasing fuel supplied, one may take an excursion from point 107 to a point such as 108 on a higher fuel delivery line 101E. However, this excursion brings the operating point close to the stall margin 103 and this is not desirable. Further, this excursion from point 107 to point 108 entails an increase in pressure ratio, as shown by the vertical axis. However, as in one form of the present invention, if an excursion from the initial operating point 107 is taken generally horizontally as along line 109 to operating point 110, then a much greater fuel increase can be tolerated and still fall below the stall margin 103. That is, if the pressure ratio is kept constant or only slightly increasing with increasing fuel flow, then a rapid excursion to high fuel-high airflow conditions can be achieved. This capping of pressure ratio is obtained by the stator manipulation discussed in connection with FIG. 3B. The pressure ratio in FIG. 4 is a function of the stator angle in FIG. 3B. Decreasing the stator angle in the region 114 in FIG. 3B causes no appreciable change in pressure ratio, but, as shown in FIG. 3E, causes an increase in gas generator airflow.

Figure 3B:
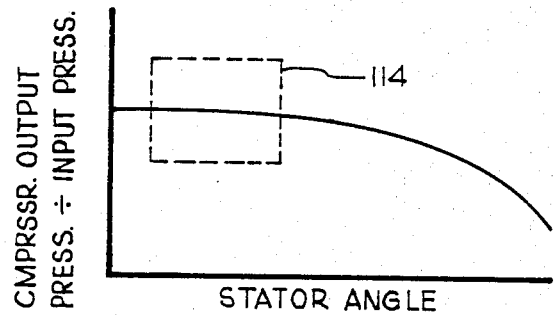
Figure 3E:
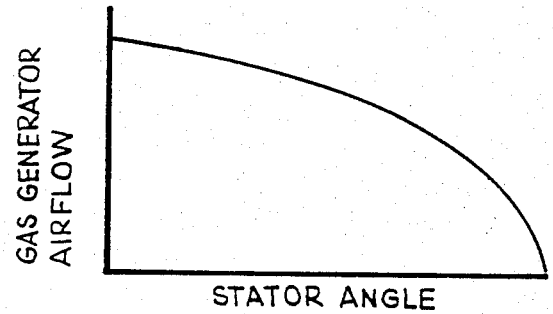
Figure 3C:
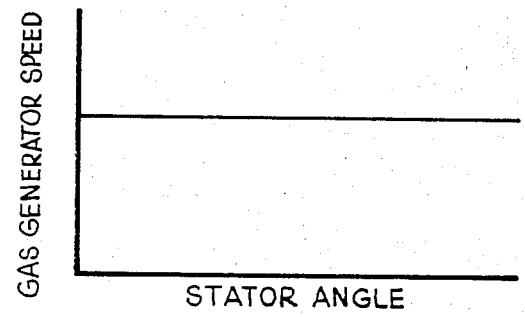

Viewed another way, fuel flow is increased in the excursion from point 107 to point 110, compressor airflow is increased by decreasing stator angle, but the decrease in stator angle results in a minimal change in the pressure ratio as shown by FIG. 3B, and the fuel-air ratio is kept constant. Thus, a horizontal excursion across FIG. 4 can be taken at constant pressure ratio. The excursion between points 107 and 110 is exemplary only. For reasons including those of engine operating efficiency, a preferable path would be that indicated by the dashed line 109A, which is generally parallel to the stall margin 103, because, speaking generally, paths of constant operating efficiency generally run parallel to the stall margin in Figures such as FIG. 4.

Another way of describing the behavior of the present invention is shown in FIG. 5 which is a plot of stator position as a function of gas generator speed. Line 117 is a stall margin. The curved lines 121A–E represent different gas generator airflows, with the upper lines (e.g., 121A) representing lesser flows than the lower lines (e.g., 121E). Thus, in following a path from point 125 to 129, a condition of low fuel flow and large stator angle at point 125 is traded for a condition of low stator angle and high fuel flow at point 129, while maintaining gas generator speed constant.

The preceding discussion concerned a first change in electrical demand from idle to 100%. A second change from 100% to 150% will now be considered and FIG. 2A illustrates such a change. Unlike the first change, the second change is transitory only and results from a malfunction such as a breakdown in one generator in a multi-generator set. Such a breakdown places a transitory overload upon the remaining, functioning generators, but only for a period until electrical equipment can be disconnected (usually automatically) from the network to lessen the total power demanded. During this period, the functioning generators, under the present invention, provide power in excess of their rated power and within an allowable range of the target frequency so that frequency-sensitive equipment is not disturbed during the automatic removal period.

As shown in FIG. 2B, the overload decelerates the generator 36 in FIG. 1 to produce a drop in frequency. The frequency drop under these overload conditions can reach seven percent as shown in FIG. 2B without violating the power supply requirements of many kinds of electronic equipment. The frequency counter 45 in FIG. 1 detects the decrease in frequency and signals the control 51 accordingly. The control 51 activates both the fuel control 55 and the stator actuator 53 to respectively increase the fuel flow to 150% as shown in FIG. 2C and to decrease the stator angle to approximately −8° as shown in FIG. 2D. These changes result in an increase in gas generator speed to 108% as shown in FIG. 2G. As shown in FIG. 2F, the fuel-air ratio increases briefly during the momentary overload of FIG. 1. The changes described in connection with FIGS. 2C–G result in an increase in power turbine speed to 107% of the speed which corresponds to the 60 Hz. target speed. Thus, adjustment of the fuel flow and stator positions allows the twin-spool engine to respond to a brief electrical load of 150%. The general principles described in connection with the plots of engine parameters as a function of stator angle apply to the overload situation just discussed.

An invention has been described wherein a twin-spool gas turbine engine drives an electrical generator which powers an electrical network. In response to increases in electrical load, the invention increases fuel delivery and increases air supplied to the compressor by opening up stator vanes. These changes, when synchronized so that combustor fuel-air ratio remains constant, result in an increase in power delivered by the gas generator to the power turbine while keeping the gas generator speed substantially constant. Engine efficiency is enhanced because the engine can be tuned for high efficiency at a single operating speed. In the case of overload conditions of approximately 150% of normal, fuel is increased, airflow is increased, but fuel-air ratio increases, gas generator speed increases, and generator frequency decreases, but only for a few seconds until the overload is reduced by the elimination of electrical load.

From another point of view, the energy delivered to the power turbine is a substantially linear function of the fuel delivered, partly because no energy is needed to accelerate the gas generator in the regime up to 100% rated power, since the gas generator speed is kept nearly constant in this regime. Further, the exhaust gas temperature remains substantially constant because, as known in the art, this temperature is substantially a function of the fuel-air ratio, which is kept approximately constant in the regime up to 100% rated power. Further, the present invention makes airflow supplied to the power turbine a function of stator angle and, since no energy is used (in the regime up to 100% rated power) for component acceleration, the energy is almost instantaneously delivered to the power turbine as a function of this angle.

The preceding discussion described the response of the present invention to increases in electrical power demanded. However, the invention responds to decreases in demand as well. Such a response is covered by the discussion above, but if the reader treats time as running from right to left in FIGS. 2A–H, rather than left to right as described.

The preceding discussion described the present invention's response to incremental changes in electrical power demanded. However, this is for explanatory purposes only. In practice, the changes will probably gradual and continuous, although perhaps rapid, rather than incremental.

The preceding discussion has described the use of the present invention with what has been termed a "twin-spool" gas turbine engine. However, the term "twin-spool" has been used for simplicity: a multi-spool engine can be used and this term encompasses that.

The preceding discussion described stator angles as having discrete values, such as 18°. This is illustrative only, inasmuch as it is known in the art that variable stator engines generally have many stages of variable stators, each stage having perhaps a different angle associated with it. However, the manner of maintaining the proper fuel-air ratio by stator manipulation is known in the art, once the functioning of the present invention is understood.

The use of the term "constant," as in keeping fuel-air ratio constant, is intended to have an engineering sense, and not a strict, literal sense. Thus, transitory overshoot and small deviations of a variable from a target value will not prevent the variable from being classified as constant.

Numerous substitutions and modifications can be undertaken without departing from the true spirit and scope of the present invention. In particular, a frequency counter need not be used to detect changes in the frequency of the electrical network, but any of a number of known devices can perform this function. For example, the functioning of the frequency counter as described above results in controlling fuel flow as a function of electrical power delivered. Therefore, a wattmeter could replace the frequency counter. In this respect, the invention can be characterized as the controlling of fuel delivered in direct proportion to power demanded, while keeping combustor fuel-air ratio substantially constant.

In addition, the plots of engine parameters given in FIGS. 2, 3, and 4 are generalized descriptions of engine behavior. The specific changes in fuel and stator position referred to therein will vary from engine to engine. However, it will be known to those skilled in the art how to change fuel flow and stator angle in order to maintain a constant fuel-air ratio. For example, a mechanical linkage can be established between a fuel control valve and a combustor air valve to maintain a constant ratio of flows through both. As another example, a feedback network known in the art can be employed to sense fuel-air ratio and to adjust fuel flow and stator position in order to maintain fuel-air ratio constant.

In addition, the method of control utilized in the regime in which power exceeds 100% can be one known in the art, that is, a standard method of fuel-air control. One reason for this is that the airflow delivered to the power turbine is generally a function of the square of gas generator speed. Thus, accelerating the gas generator from 100% rated speed to 110% rated speed provides a greater airflow than a similar increment in speed, but at a lower speed. Consequently, the response time is faster at higher gas generator speeds and the need for the rapid response features of the present invention decreases. Thus, the present invention can be used in operating regimes up to 100% of rated power, with reversion to prior art controls above 100%.

A discussion of engine fuel-air ratio has been given. Applicant points out that a knowledge of power turbine inlet temperature (sometimes called T44) together with a knowledge of fuel rate of flow allows a computation of fuel-air ratio. This fact can be used in the present invention to compute fuel-air ratio. Further, this fact allows a method of maintaining fuel-air ratio constant: the ratio is measured in this manner, a control known in the art is used to sense a deviation from constancy and if a deviation is sensed, the control modifies either fuel or airflow, as described above, in order to maintain constant fuel-air ratio. This modification is done simultaneously with any modification dictated by changes in frequency. That is, in this embodiment, a simultaneous, dual feedback is used: the frequency is fed back to the fuel control to control fuel flow and the temperature information (indicative of fuel-air ratio) is fed back to control airflow, as by modulating stator vanes.

It is to be understood that this invention is not limited to the particular embodiment disclosed, and it is intended to cover all modifications coming within the true spirit and scope of this invention as claimed.

What is desired to be secured by Letters Patent is the invention as defined in the following claims.

I claim:

1. Apparatus for controlling a gas turbine engine having a gas generator stage for supplying exhaust gases to a power turbine stage which drives an electrical generator, the gas generator stage having variable stators, comprising:
   (a) sensing means for sensing the frequency of the power produced by the electrical generator and for producing a frequency signal indicative thereof;
   (b) control means which receives the frequency signal and which, in response, modulates both the fuel supplied to the engine and the variable stators in the engine to maintain combustor fuel-air ratio substantially constant for
      (i) maintaining gas generator speed substantially constant, and
      (ii) maintaining electrical generator speed substantially constant.

2. Apparatus for controlling a gas turbine engine having a gas generation stage for supplying exhaust gases sequentially to a power turbine stage which drives an electrical generator and then to a heat exchanger stage, comprising:
   (a) sensing means for sensing the frequency of the power produced by the electrical generator and for producing a frequency signal indicative thereof;
   (b) control means which receives the frequency signal and which, in response, modulates the fuel supplied to the engine while maintaining combustor fuel-air ratio substantially constant for
      (i) maintaining gas generator speed substantially constant,
      (ii) maintaining electrical generator speed substantially constant, and
      (iii) maintaining exhaust gas temperature substantially constant.

3. A method of controlling a gas turbine engine which has a gas generation stage containing variable stators and supplying exhaust gases to a power turbine stage which drives an electrical generator, comprising the following steps:
   (a) sensing the speed of the electrical generator;
   (b) ascertaining a deviation of the speed of (a) from a predetermined speed;
   (c) in response to the deviation of (b), modulating the variable stators and the fuel supplied to the engine so that
      (i) the combustor fuel-air ratio remains substantially constant,
      (ii) the speed of the gas generator stage remains substantially constant, and
      (iii) the deviation of (b) is reduced.

* * * * *